United States Patent
Klau et al.

(10) Patent No.: US 9,092,390 B1
(45) Date of Patent: Jul. 28, 2015

(54) ELECTRONIC BADGE CLEARINGHOUSE

(75) Inventors: Richard P. Klau, San Ramon, CA (US); Michael W. Crosby, San Mateo, CA (US); John A. Costigan, III, Mountain View, CA (US); David Joiner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 13/190,109

(22) Filed: Jul. 25, 2011

Related U.S. Application Data (60) Provisional application No. 61/367,319, filed on Jul. 23, 2010.

(51) Int. Cl.
G06F 15/177 (2006.01)
A63F 13/40 (2014.01)
G06F 17/30 (2006.01)
G06F 17/40 (2006.01)

(52) U.S. Cl.
CPC .............. *G06F 15/177* (2013.01); *A63F 13/10* (2013.01); *G06F 17/30002* (2013.01); *G06F 17/40* (2013.01)

(58) Field of Classification Search
USPC ........................................................ 709/203
See application file for complete search history.

(56) References Cited

U.S. PATENT DOCUMENTS

| | | | |
|---|---|---|---|
| 7,076,504 B1 | 7/2006 | Handel et al. | |
| 8,001,003 B1 * | 8/2011 | Robinson et al. | 705/14.53 |
| 8,510,660 B2 | 8/2013 | Morin et al. | |
| 2006/0224514 A1 | 10/2006 | Buschi et al. | |
| 2007/0173324 A1 * | 7/2007 | Multerer et al. | 463/42 |
| 2009/0049070 A1 | 2/2009 | Steinberg | |
| 2010/0106557 A1 * | 4/2010 | Buss | 705/10 |
| 2011/0107225 A1 * | 5/2011 | Sukanen et al. | 715/736 |
| 2012/0047017 A1 * | 2/2012 | Hernandez et al. | 705/14.55 |
| 2012/0124479 A1 | 5/2012 | Morin et al. | |

FOREIGN PATENT DOCUMENTS

| | | |
|---|---|---|
| WO | WO 2009/023735 | 2/2009 |
| WO | WO 2010/002748 | 1/2010 |
| WO | WO 2012/094269 | 7/2012 |

\* cited by examiner

*Primary Examiner* — Angela Nguyen (74) *Attorney, Agent, or Firm* — Fish & Richardson P.C.

(57) ABSTRACT

A computer-implemented method for handling electronic achievement information involves receiving, from a first user of an achievement aggregation system, a selection of a plurality of achievement tracking services that are operated by organizations that are separate from the operator of the achievement aggregation system; establishing an authenticated electronic communication connection between the achievement aggregator system and each of the one or more achievement tracking services; obtaining from each of the achievement tracking services, information sufficient to characterize one or more achievements obtained by the user; aggregating the information obtained from each of the achievement tracking services into a user achievement profile; and providing the user achievement profile for presentation to one or more users who request profile information about the first user.

20 Claims, 4 Drawing Sheets

ELECTRONIC BADGE CLEARINGHOUSE

CROSS-REFERENCE TO RELATED APPLICATION

This application claims priority to U.S. Provisional Application Ser. No. 61/367,319, filed on Jul. 23, 2010, entitled "Electronic Badge Clearinghouse," the entire contents of which are hereby incorporated by reference.

TECHNICAL FIELD

This document relates to systems and techniques for sharing and presenting badges and similar items that represent achievements by users of an electronic computing system.

BACKGROUND

Users of social networks typically enjoy sharing information about themselves with friends and others, and with seeing information about their friends. For example, many users provide short posts that describe recent happenings in their lives, link to content that they recently located and found to be interesting, or post digital photos of things they have done recently.

Social network systems also provide services that track what users do and that require less active involvement of the users. For example, a user may allow his or her location to be tracked (e.g., with GPS functionality provided in their smartphone) and reported to friends. A user may also "check-in" at particular venues such as restaurants, bars, and museums, and the occurrence of the visit may be reported to the user's friends or to others. The user may then make comments about the venue, and other users can later see those comments (e.g., as restaurant reviews and the like).

Users may also accumulate status points for visiting certain venues, and their status may be represented by an icon that can be displayed with their user profile in a system. For example, if a user visits museums frequently, a system can give the user an award that is represented by a badge on their home page or profile that indicates that the user is thoughtful and sophisticated (e.g., a badge that has a representation of Galileo in it). Such a badge can be seen by other users, who may then make judgments about the first user based on the types of badges the user has—much like people may make judgments about a member of the military based on the ribbons they see on the person's dress uniform.

SUMMARY

This document describes systems and techniques that may be used to manage awards for user achievement across multiple different systems. For example, various different social networks may assign awards to their users and represent those awards with badges that can be viewed in relation to the user, and a separate service may receive and accumulate information about the various awards so that a composite picture of the user's achievement across multiple systems may be generated.

The communication links between the various social networking organizations and the aggregating organization may be authenticated or verified connections, such as via OAuth or rel-me microformat, so that the aggregating organization and its users can trust that information provided by the aggregating organization is legitimate, and that user achievements are not fabricated, particularly in more important areas. (The number of times a person has visited a particular fast food restaurant might not be important from an authentication standpoint, whereas the user's professional achievements probably would be.)

The aggregation of user achievement information may be employed in a variety of manners. For example, a user's profile page at a particular site may reflect all of the achievements that the user has achieved with various different organizations. As one example, the user may belong to one social network for athletic-related activities, and another for visiting (and commenting on) restaurants and similar venues. The user's athletic and eating/drinking activities can both be displayed to other users in a single location using the techniques discussed here. Similarly, the user may belong to a "professional" social networking system that is able to authenticate claims for employment, e.g., by calling listed employers to confirm that a person had the jobs he claims to have had. Such professional achievements may then be combined with more recreational achievements that the user may have recorded on a more general social networking site.

Also, particular achievements may be combined across multiple different organizations—as one example, a user may have a badge that shows how many times they have gone to Mexican restaurants, and the number shown on an aggregated badge may reflect the sum of the times the user has checked into Mexican restaurants using any of the various social networks to which the user is subscribed.

Other achievements by the user may be related to factors other than attendance of the user at a venue or other similar real-time user tracking. For example, a user may be licensed or otherwise qualified in an activity by a licensing agency, and the user may wish to have that qualification displayed to people who visit the user's profile page, and to have it done in a way so that the visitors are confident that the qualification is legitimate. Thus, for example, a licensing organization, like a state bar association for attorneys, could provide a stub at its website for each of the lawyers licensed by the organization. The organization may mediate access to the stub using traditional credentialing, such as by assigning each licensed attorney an ID and password they must enter before accessing their page or other content. Each attorney may then use their credentials to point to their page or other objects to their profile page, such as a page with a badge aggregating service and can point the profile page back at their bar page, so as to set up an authenticated or verified connection. The organization that generates the profile page may have preexisting relationships to each state bar association so that the organization knows that it can trust each of the bars organizations, and the profile page organization may thus display a badge on the user's profile page that shows the user is licensed (and perhaps also show if he is in good standing, if the bar organization has left the user's content up) in the particular state. Such information may be relevant to users who want to hire the person as a lawyer, and want to confirm that the person is licensed in their state.

In addition, a user may provide for automatic filtering of badges or other content that is brought to a central profile page from multiple social systems. For example, a user may define that badges of a certain type (e.g., that suggest the user's activity in less-than-professional endeavors) not be shown. Such badges can be identified by meta data that is provided with the badge (e.g., a badge name or category) or in other ways as may be agreed upon among the various organizations (e.g., via a public application programming interface (API)).

In certain implementations, such systems and techniques may provide one or more advantages. For example, users of social networking systems may be able to aggregate their disparate information, and have their achievements seen more conveniently and clearly by their friends, followers, and other users. Social networking systems may benefit because more users will generally associate themselves with a system that can show complete information, so that such users can learn of new social networking services when they view aggregated information, and may thus choose to be involved with new services. Also, users are more likely to make the investment to get involved with a particular service if they know that they can use other services for other social networking purposes. In addition, the systems and techniques described here can permit for the relatively simple and secure integration of information from services other than social networking services, such as from professional credentialing organizations.

In one implementation, a computer-implemented method for handling electronic achievement information is provided. The method comprises receiving, from a first user of an achievement aggregation system, a selection a plurality of achievement tracking services that are operated by organizations that are separate from the operator of the achievement aggregation system; establishing an electronic communication connection between the achievement aggregator system and each of the one or more achievement tracking services; obtaining from each of the achievement tracking services, information sufficient to characterize one or more achievements obtained by the user; aggregating the information obtained from each of the achievement tracking services into a user achievement profile; and providing the user achievement profile for presentation to one or more users who request profile information about the first user. The method can also comprise aggregating the information obtained from each of the achievement tracking services with information sufficient to characterize one or more achievements obtained by the user with an organization that operates the achievement aggregation system. Moreover, the method can include providing a list of social networking services to the user and receiving the selection from the user in response to providing the list to the user.

In certain aspects, the electronic communication connections are established using a public, open connect-style application programming interface. Also, the information sufficient to characterize one or more achievements obtained by the user can comprise information that identifies one or more badges that each visually represents one of the achievements. In addition, aggregating the information obtained from each of the achievement tracking services can comprise arranging badges awarded by each of the plurality of achievement tracking services into a single integrated display of badges that includes badges from different independent services.

In yet other aspect, aggregating the information obtained from each of the achievement tracking services comprises creating new badges that represent on or more badges from the plurality of achievement tracking services. A first badge of the one or more new badges can represent a sum total of achievements combined from two or more of the achievement tracking services. The first badge in such a situation can display the sum total and contributed totals for each of the achievements from each of the achievement tracking services. The first badge can alternatively be of a badge type that differs from any badge types received from the achievement tracking services.

In other aspects, aggregating the information for the first badge comprises identifying badges types for at least two badges from the achievement tracking services, and identifying a badge type supported by the achievement aggregation system that corresponds to the identified badge types. Also, providing the user achievement profile can comprise serving code for displaying badges that represent the user's achievements on a profile page for the user. Moreover, providing the achievement profile can comprise providing information to a qualified third party requester that represents the aggregated information.

In another implementation, a computer-implemented user achievement data management system is disclosed. The system comprises an organization interface, an aggregator, and a user interface. The organization interface is programmed to communicate via electronic communication connections with one or more third-party achievement tracking services that provide information that characterizes one or more achievements made by particular users of the achievement tracking services. The aggregator is programmed to join achievement information for particular users obtained from different achievement tracking services, so as to generate an aggregates achievement profile that represents a combination of achievements for users across multiple third-party achievement tracking services. And the user interface is arranged for generating content that, when displayed, shows the joined achievement information in a single integrated display of achievement information for particular users.

In some aspects, the aggregator is further programmed to aggregate the information obtained from each of the achievement tracking services with information sufficient to characterize one or more achievements obtained by the user with an organization that operates the data management system. The user interface can also be arranged to provide a list of social networking services to the user and receive a selection from the user in response to providing the list to the user, the selection identifying services to which the organization interface is to establish connections. The electronic communication connections can also be established using a public, open connect-style application programming interface.

In another implementation, a computer-implemented user achievement data management system is disclosed that includes an organization interface programmed to communicate via electronic communication connections with one or more third-party achievement tracking services that provide information that characterizes one or more achievements made by particular users of the achievement tracking services; means for creating aggregated data out of individual user data from different third-party achievement tracking services to reflect total achievements be users across the multiple services; and a user interface for generating content that, when displayed, shows the joined achievement information in a single integrated display of achievement information for particular users.

The details of one or more embodiments are set forth in the accompanying drawings and the description below. Other features and advantages will be apparent from the description and drawings, and from the claims.

DETAILED DESCRIPTION

This specification discusses aggregation, sharing, and presentation of user achievement data. Such data represents activities and accomplishments achieved by individual users or groups of users of on-line networked systems. The achievements may be as minor as attending particular fast food restaurants many times, and as major as obtaining a difficult certification in a profession (e.g., a certification of a certain surgical specialty for a medical doctor).

The information is shared in the examples discussed here by forming authenticated or verified electronic communication connections between services that track and verify user achievements, and a central achievement aggregation system. The central system may receive the information from a variety of different sources, such as by using known social communication application programming interfaces (APIs), may combine and reformat the information, and perhaps generate new information that describes users' achievements, and then may provide it, either directly for review by the user or other users, or to another system that can use the combined achievement information. As one example, the aggregation system may provide information for display on a user's on-line profile page so that, when other users go to the page, they will see badges or other representations of all the first user's achievements in a single, integrated format, even though those achievements may have been obtained from a variety of independent services that track such information.

Figure 1:
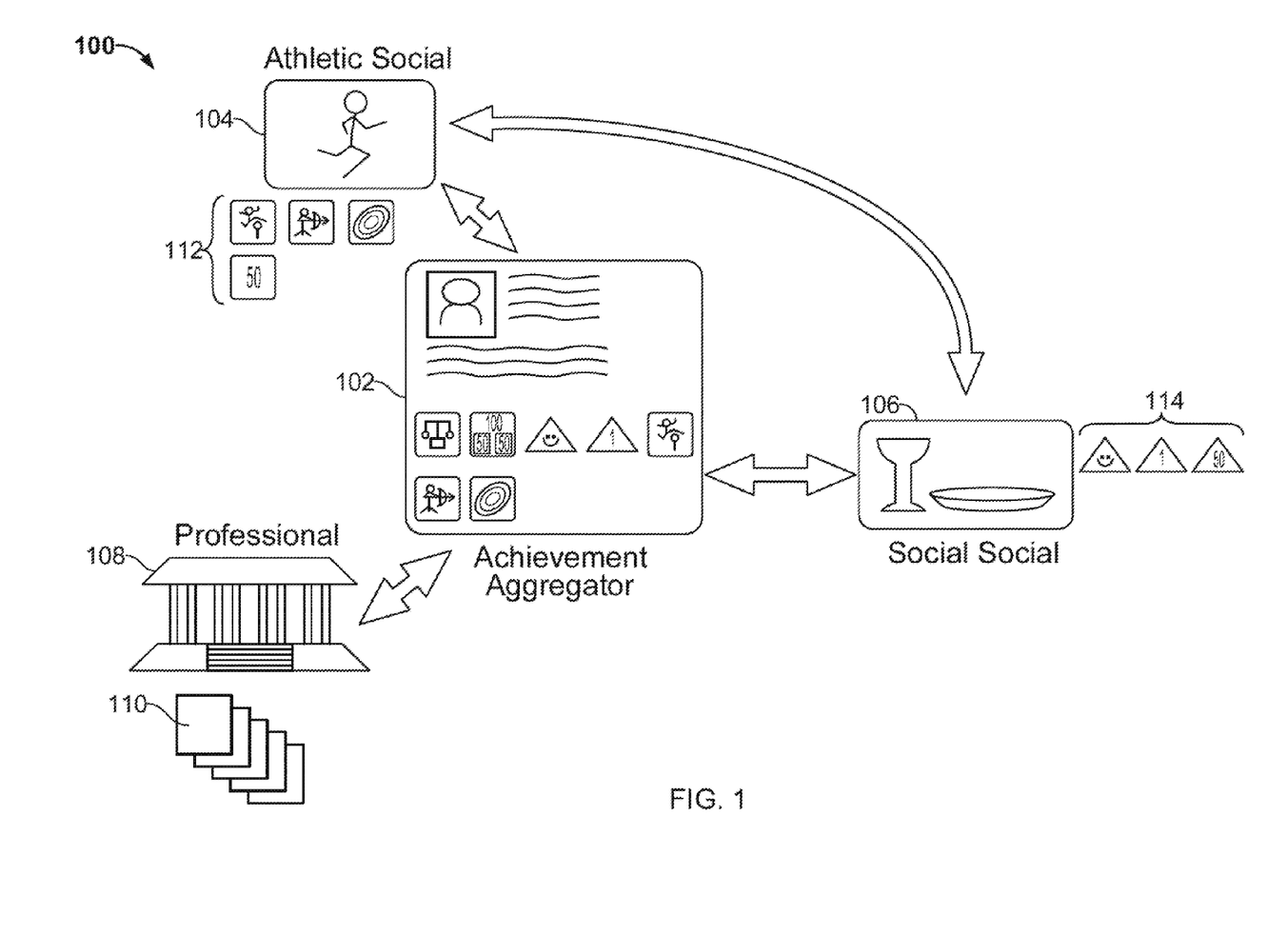
FIG. 1 shows a conceptual diagram of a system 100 for sharing an aggregated user achievement information, including from social network systems that operate independent of each other and are run by distinct organizations.

FIG. 1 shows a conceptual diagram of a system 100 for sharing and aggregating user achievement information, including from social network systems that operate independently of each other and are run by distinct organizations. The system 100 is generally arranged in a hub-and-spoke manner around an achievement aggregator system 102, which may communicate with multiple different achievement tracking systems 104-108, so as to obtain and aggregate achievement information so that such information can be presented to the particular users or other users (e.g., their friends or followers) in a combined manner.

The aggregator system 102 is represented in the figure in the form of a profile page for a particular user of the systems 100 and 102. For example, the user may have an account with the organization that operates the achievement aggregator 102, and the profile page may be one of the services that the organization provides to the user. It may provide the user with a profile page where the user may display personalized content that other users may review. For example, the user may include a photo of themselves, and other photos, contact information, information about their current employer and past employers, information about their education, personal likes and dislikes, and other similar information that is traditionally displayed on a personal profile.

The achievement aggregator 102 is shown in the figure, by means of two-headed arrows, as communicating with several other subsystems. The achievement aggregator 102 is at the center of the communication network and thus can communicate with each of the other subsystems. A first subsystem is an athletic social networking service 104 that provides a variety of services relating to athletic activities for its users. For example, the athletic social service 104 may provide profile pages for each user and may show information about the users, such as a user's current weight as reported by an electronic scale that may be in the user's home, and distances that the user has run, such as by using data that is automatically uploaded by portable devices that users may carry with them when they run, and that may be synchronized to a network-attached computer.

The athletic social service 104 is displayed along with a number of badges 112, which represent achievements that led to awards for the user of the service 104. In this example, four badges 112 are shown, and are represented by square icons positioned below the service 104. One badge shows a person high hurdling, and may represent an achievement in a particular track and field area for the user. Another badge shows a user shooting a bow and arrow, and may indicate a proficiency in archery for the user, such as the fact that the user may have scored a certain level in a controlled competition in archery. Another badge shows an aerial view of a running track, and may represent that the user has competed in particular track events. A fourth badge displays the number 50, and may indicate that the user has run for 50, 500, or 5000 miles during a certain period such as the previous week, month, or year. Each icon for the badges 112 may be displayed when a user visits the athletic social service 104 and identifies the particular user who corresponds to the profile page.

As shown by the two-headed arrow between the athletic social service 104 and the achievement aggregator 102, an authenticated or verified communication connection may be established between the two systems. Such a connection may be formed by the particular user pointing from the athletic social service 102 to their profile page at the achievement aggregator 102, and by the user pointing from the achievement aggregator 102 to the athletic social service 104. With such an authenticated or verified communications connection established, the achievement aggregator 102 may request the achievement information about the user and other users for which the connections were formed. The athletic social service 104 can then provide sufficient information to reflect the athletic achievements represented by the icons for the badges 112, and may pass the information to the achievement aggregator 102 in various manners, including by standard communication protocols such as extensible markup language (XML).

The information needed to characterize the achievements may take a variety of forms. First, the information may include an identifier for the user that can be recognized by both the athletic social service 102 and the achievement aggregator 102 so that the information is properly assigned to the right user when it is obtained by the achievement aggregator 102. The information may also include a title for the achievement (e.g., "Nerd Badge"), and a longer description of the achievement (e.g., "You have checked in at science museums more than 5 times."). In addition, the information may include a parameter for the achievement such as "miles run since X date", and a value or values to the parameter, such as the total of miles that the particular user has run in the relevant time period defined by the parameter. The information may additionally include information needed to construct an icon that represents the achievement, including a fixed digital image or a URL that points to a stored and network-accessible image.

In the example system 100, the achievement aggregator 102 is also shown communicating with a social social service 106. This social social service 106 is referred to as being "social" because it focuses on social activities that a user may undertake, such as meeting friends for food and drinks, as represented by the plate and wine glass shown with the social social service 106. Like the athletic social service 104, the social social service 106 is shown here along with several badges 114. The form of the social social service 106 badges is triangles rather than squares, and the particular form of badges may be selected by the particular social service that initiates the badges. The shapes in this example were chosen to help visually distinguish badges that originate at athletic social service 104 from badges that originate at social social service 106, though the form of badges may be selected in an appropriate manner by the respective services.

In this example, a first badge with a smiley face indicates a user achievement of going to a certain number of comedy clubs with friends. Badges with the numbers 1 and 50 in them are also shown. The badge with the number 1 may indicate that a user is the top user for a certain activity, while the badge with the number 50 may indicate a number of miles that the user has run during a time period—similar to the last of the badges in group 112.

A two-headed arrow that is also shown between athletic social service 104 and social social service 104 indicates that the two social services may form a communication channel directly between themselves to provide for sharing of information in addition to, or alternatively to, providing information via achievement aggregator 102.

As shown in the figure, an aggregated group of icons for the user's achievements is shown inside the profile page for the achievement aggregator 102. These icons represent a combination of the badges 112 and 114 from the athletic social service 104 and the social social service 106, respectively. Some of the badges are simply repeated in the form that they would appear on a profile page for the same user with the social service from which the badge came. For example, the first two triangle badges are shown in the same form, as are the first three square badges from the athletic social service 102.

However, the badges showing the number of miles run by the user with respect to each of the social services have been replaced by a single badge in the aggregated user profile at the achievement aggregator 102. In this example, the achievement aggregator has analyzed the data for each of the incoming achievements, determined that they relate to a common achievement, extracted the parameter values for the achievement from each of these social services, and added the values to each other to identify that the user has one value of 100 instead of two values of 50. Also, an icon has been created by the achievement aggregator 102, which shows the number 100, but also shows the two 50-value icons, so that a viewer of the aggregated profile may readily see that the value of a particular achievement was created by the contribution of two different achievements at two different systems. The particular way of showing that achievement as a combination from two different services may be achieved in various manners, and the particular example shown here has been selected for clarity of explanation.

An additional icon on the profile page for the user shows the scales of justice. This icon is generated, not from an icon previously created at a social network, but by using data that indicates achievement by the user in the professional world. In particular, a professional system 108 may form a communication link with the achievement aggregator 102 in ways like those discussed here for the social services. The professional system may be, for example, a system run by the state government or other licensing authority that has power to certify professionals and others in particular technologies, fields, or specialties. In this example, the professional system 108 is shown as a courthouse, to represent that it is a website operated by an entity that licenses attorneys.

A plurality of documents 110 are shown with the professional system 108, and represent network accessible information, such as webpage stubs, that may be generated by an administrator of the professional system 108. Each licensed member of the organization may be provided with a stub, and access to that particular stub may be limited to a member who provides the proper credentials for logging into the system as that member. As a result, the member (or their agent) may cause the stub to be pointed at the achievement aggregator 102 profile page for that user, and may cause the achievement aggregator 102 profile page to point back at the stub. As a result, the professional system 108 may indicate to the achievement aggregator 102 that a particular user corresponding to a particular profile is a licensed attorney in the state, and the achievement aggregator 102 may create a particular icon that represents as much (e.g., the scales of justice icon). In this manner, the system 100 may also represent various achievements that are not related to a social network but that may be very important for a particular member of the system 100 to display.

Also in this way, a user can join multiple different social networks that each provide something of value to the user, and even though no social network meets all the user's needs. But the user can have their achievements reported in a single location, including with achievements from pages that are not part of public social networking sites.

In certain implementations, individual users may be given the opportunity to apply manual or automatic filters to limit the number or type of badges that will be displayed on their profiles. For example, once has user has imported and aggregated all their badges from other services, they may be shown a list of all the badges and may be given an opportunity to select particular badges or classes of badges that they want included or excluded, respectively, from the badges that are displayed on their profile page. For example, a user who is graduating from college may wish to block the display of badges that reflect the user's prior social activities in a manner that may negatively reflect on the user's employuability.

Figure 2:
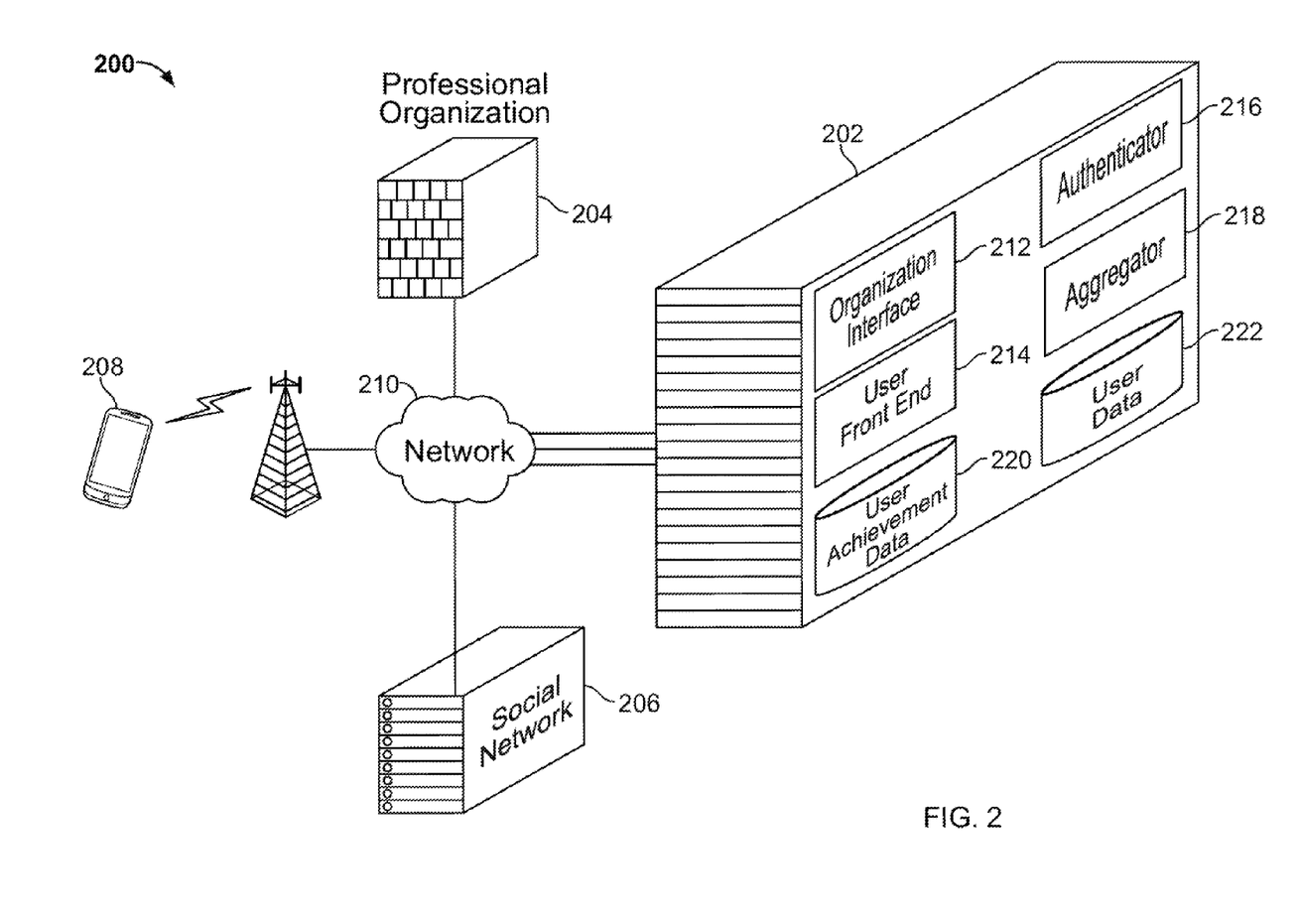
FIG. 2 is a schematic diagram of a networked system for sharing and managing achievement information.

FIG. 2 is a schematic diagram of a networked system 200 for sharing and managing achievement information. In general, the system 200 centers around an aggregation server system 202 that receives achievement information from a number of other distributed components in the system 200, and can provide the information, after processing it in various manners, out to the originating components or to other components. The system 200 may be arranged to operate like the system 100 describe above with respect to FIG. 1.

The components communicate through a network 210, which may include various local and wide area networks, including the internet. The communications may take place via various well-known mechanisms, such as HTTP requests, HTML, XML, and others. In this particular example, all communications are between the server system 202 and one of the other components. The server system 202 is shown schematically as a rack server to indicate that the services discussed here may typically be provided by an operator of a large data center that provides a wide range of computing services such as mapping services, search engine services, email services, and the like.

The server system 202 may communicate with a portable client device 208 and two other server systems 204, 206 that are operated by organizations that differ from each other and from the organization that operates the server system 202. In addition, the web addresses for each of the various server systems may be associated with different domains. A professional organization server system 204 represents an organization that qualifies, licenses, or otherwise certifies particular users as having competence in a particular area. The server system 204 may be a secure system that allows members who it has certified to access it with an ID and password, so as to prevent imposters from accessing the system 204. As discussed above and below, the particular members can edit content on the system 204 so as to point their content at the server system 202, and can make similar actions pointing from system 202 to system 204. Such actions may allow the systems to establish a communication channel with each other with respect to the particular user (though different users can perform similar steps so that various communication channels can be open for multiple users).

In a similar manner, a social network system 206 may be in communication with the system 202. In this example, however, a user may not need to take affirmative actions to have their achievement information shared between the systems. Instead, the two systems 202 and 206 may agree to share certain public information about users under a standard API. Using such mechanisms, the system 200 may provide data sharing functionality like that discussed above. The user may also be prompted to permit a certain level of information sharing via the API, again using methods that are known.

Particular components within the aggregation server system 202 may drive the operation of such functionality. For example, an organization interface 212 manages interactions between the system 202 and other server systems that might provide user information to the system 202, such as systems 204 and 206. The organization interface 212 may implement, for example, standard mechanisms like OAuth for establishing a communication connection so that information may be received by one of the systems with trust that it is accurate and properly corresponds to the identified user.

An authenticator 216 is provided to assist in determining whether a particular other service is legitimate and something that the system 202 should accept data from. The authenticator 216 may include components for checking the bona-fides of another service, or to determine whether the other service is likely to be legitimate and to provide good clean data, and to perform other operations needed to assist the organization interface 212 in setting up authenticated or verified communication connections.

A user front end 214 permits various users to request and view their own profiles or profiles of other users. The main information for a profile may be gathered in a familiar manner, such as by accessing the user data store 222, which may store personal information about each user in the system, such as name, birth date, gender, group to which the user has made an association, and the like. The profile may also gather information for displaying badges or similar user achievement indicators for a user whose profile is to be displayed. The information may be stored as user achievement data 220 and made available to the user front end 214 for generation of appropriate reports such as profile pages.

Finally, an aggregator 218 is provided to turn data about user achievement received from individual service into a single, integrated larger data set so that all of a user's achievements across multiple services can be conveniently displayed on a profile page. The aggregator may obtain information from the organization interface 212 or the user achievement data 220 and may look for commonalities between achievements tracked by different services. The aggregator may then perform actions like those discussed above and below to aggregate the various information, including by modifying badges or creating new badges, and by arranging the various aggregated badges for display to a user or users.

Figure 3:
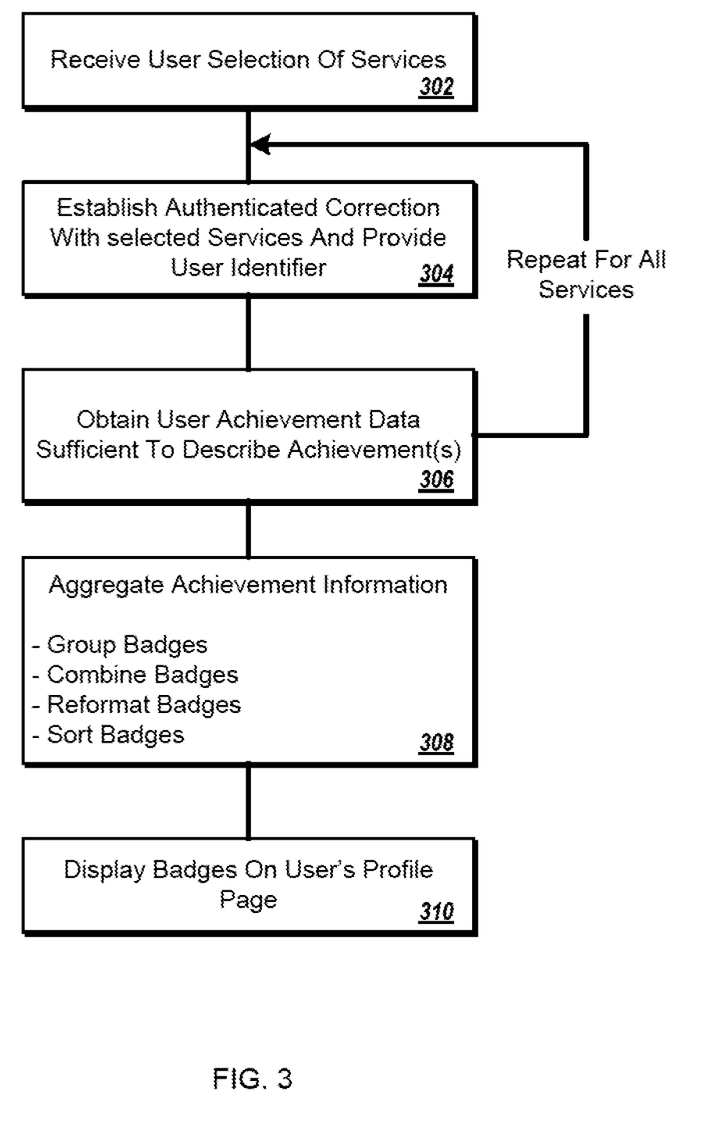
FIG. 3 is a flow chart of an example process for managing user achievement information that has been generated by a number of different organizations

FIG. 3 is a flow chart of an example process for managing user achievement information that has been generated by a number of different organizations. In general, the process involves identifying sources of achievement information for a particular user, establishing authenticated or verified electronic communication connections with those sources, and obtaining particular information about the user from each of the sources, and then aggregating the information and providing it to be made available for presentation to users of a system in various manners.

The process begins at box 302, where a user selection is received that identifies services from which the user would like to have their achievement information imported. For example, the process may provide a list of social networking services with which a system that runs the process has informationsharing relationships. The system may then allow a user to select certain listed services. Alternatively, or in addition, the system may search for a name or a handle (a unique or essentially name for the individual in the system or systems, which may be an email address or a screen name) for the user at the first service that is run by the system, and then to see if that handle is present at the other services. The system may then present the services with a match for the handle or identifier that was found.

At box 304, the first service (i.e., at the system that is executing the process described here) may establish an authenticated or verified connection with the services (e.g., as provided by various social networking sites or services) that the user selected, and may provide an identifier for the particular user to those services. The first service may, in this example, be an aggregation service that is arranged to obtain information from the other services and to provide it back to various users (e.g., at a profile page for the aggregation service or at profile pages for each one of the other services) once it has been aggregated If the user information that is provided by the aggregation service is appropriate, the service may obtain user achievement data sufficient to describe achievements made by the user at the other service, as shown in box 306. As discussed above, that user achievement data may include an identifier for the achievement such as an identified achievement number, an identifier for the user, a name of the achievement, a description of the achievement, information needed to connect an icon or other form of badge for display for the achievement, and other relevant information. The transfer of information may take various forms including an XML transmission. Such forms of communication connections with other services, and obtaining achievement information from those services, may continue until each of the services identified by the user has been checked for relevant information (as indicated by the "repeat for all services" arrow). For example, an aggregation service may first check the user's main social networking site, may then check a specialized site that tracks the user's physical fitness achievements, and may then check even more specialized sites such as professional licensing organizations.

At box 308, the aggregation service aggregates the achievement information that may have been obtained from the various separate and individual services that are run by different third parties. The aggregation may take a variety of forms, and certain example processes are shown here. For example, the process may group badges, so that badges of a particular type will be displayed near each other when a profile for the user is displayed. For example, badges relating to certain geographic locations may be grouped together, as may badges that represent a particular activity by a user (e.g., eating, sports, etc.).

Badges may also be combined. For example, if a user has the same badge from two different services, one of the badges may be removed, a badge that approximates the look of the two initial badges may be created, or a badge may be created that visually indicates that it is the result of two original badges, similar to the badge with the number 100 in FIG. 1.

As an additional aggregation step, certain of the badges may be re-sized and re-formatted. Such re-formatting may take the form of changing the sizes of badges, the shapes the badges (especially the peripheral shape), and otherwise affecting the way the badges will be displayed, so that badges that may have originated at different services may visually match each other so as to form a more pleasing visual representation of the badges in a display adjacent to each other. Finally, the badges may be sorted, so that, for example, badges that may be determined to be most important, may be displayed at the beginning of a list of badges. For example, badges that relate to professional achievements and other badges believed to be important to other users may be placed higher in a listing of badges that is to be shown to users.

At box 310, the aggregated group of badges is displayed on a user's profile page, either to the user, or to other users that may visit the profile page. The display may take a familiar form, such as by providing the badges as icons that are stacked above and next to each other in a rectangle, similar to the manner in which ribbons are positioned on the breast of the jacket of a member of the military. The display may occur on a profile page at the aggregator's domain, or at a domain of one of the organizations that provided badge information. For example, the user's main social networking site may show badges that the user earned there in addition to badges that the user earned from a wholly separate physical fitness site.

In this manner, the process may provide a convenient mechanism by which to combine information from various different social network sites and other sites so that a single user's achievements can be combined so that all of the individual achievements and accomplishments by the user can be readily appreciated. The combination of the achievements may be made relatively seamless visually by adjusting icons and other visual representations for each of the achievements, and displaying those adjusted icons in a consistent manner with each other. The display may be on a particular aggregated site or on each of the user's various sites, so that when a visitor brings up a personal page for the user, the visitor is shown a combination of achievement icons from various different services.

Figure 4:
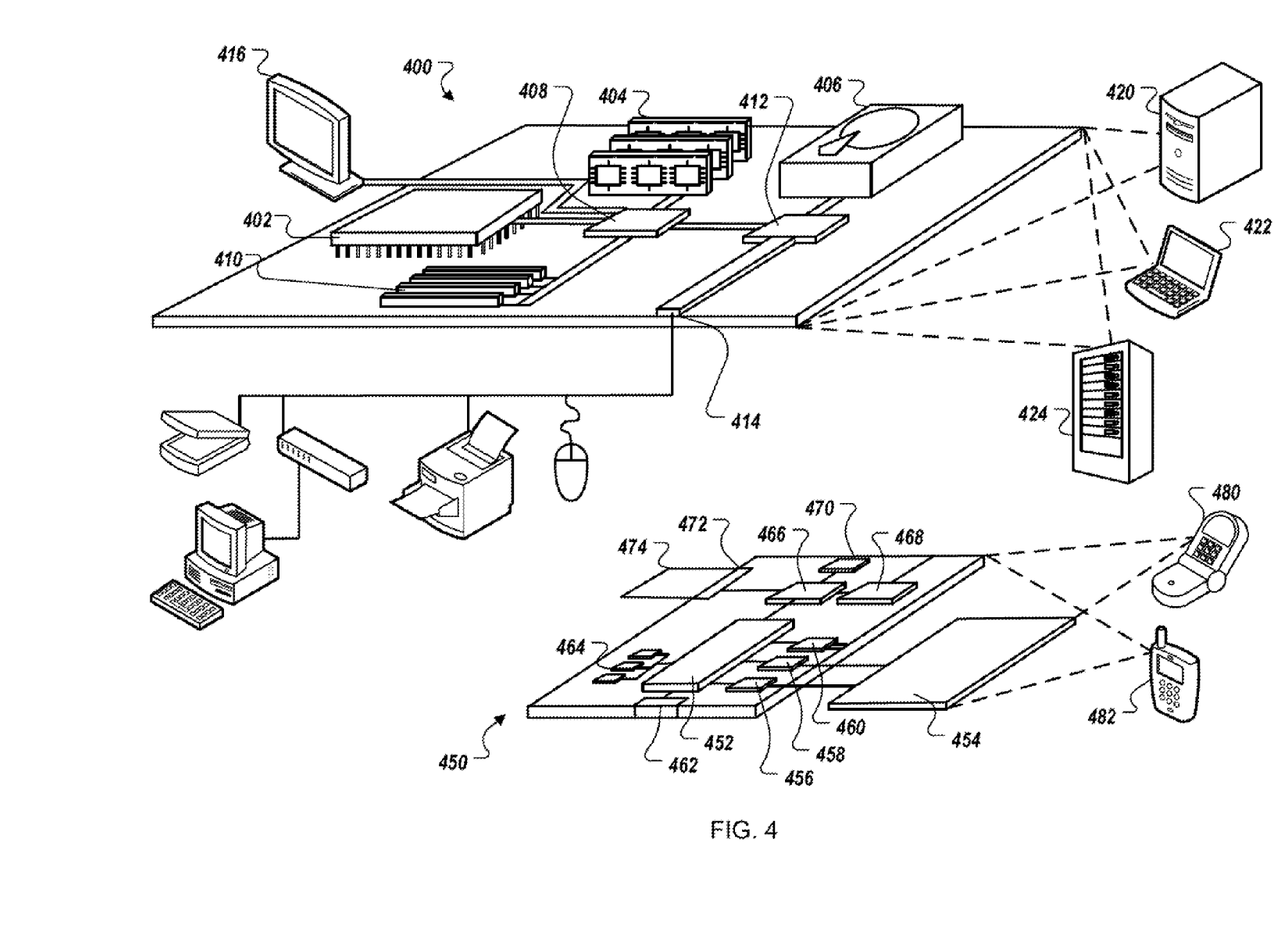
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of badges, and in social networks, but other forms of symbols for recognizing achievement can be used, and in other settings.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for handling electronic achievement information, the method comprising:
    receiving, from a first user of an achievement aggregation system, a selection of a plurality of achievement tracking services, wherein at least one of the achievement tracking services is operated by an organization that is separate from an operator of the achievement aggregation system, a first achievement tracking service operates independently from at least a second achievement tracking service, and the first and second achievement tracking services are operated by separate organizations;
    establishing an authenticated or verified electronic communication connection between the achievement aggregation system and each of the achievement tracking services;
    obtaining from each of the achievement tracking services information sufficient to characterize one or more achievements obtained by the first user;
    obtaining data for displaying graphical icons produced by each of the achievement tracking services, each graphical icon visually representing a defined achievement for the respective achievement tracking service that may be earned by a user of the respective achievement tracking service upon performing tasks communicated to users by the respective achievement tracking service;
    aggregating, by the achievement aggregation system, the information obtained from each of the achievement tracking services into a user achievement profile that includes information about achievements obtained by the first user on multiple systems that include the first achievement tracking service and the second achievement tracking service; and
    providing the user achievement profile for presentation to one or more users who request profile information about the first user, the presentation including concurrent display of the graphical icons produced by each of the achievement tracking services for tasks performed by the one or more users.

2. The method of claim 1, further comprising aggregating the information obtained from each of the achievement tracking services with information sufficient to characterize one or more achievements obtained by the first user with an organization that operates the achievement aggregation system.

3. The method of claim 1, further comprising providing a list of social networking services to the first user and receiving the selection of the plurality of achievement tracking services from the first user in response to providing the list to the first user.

4. The method of claim 1, wherein the electronic communication connection is established using a public, open connect-style application programming interface.

5. The method of claim 1, wherein the information sufficient to characterize one or more achievements obtained by the first user comprises information that identifies one or more badges that each visually represents one of the achievements.

6. The method of claim 1, wherein aggregating the information obtained from each of the achievement tracking services comprises arranging badges awarded by each of the plurality of achievement tracking services into a single integrated representation of badges that includes badges from different independent services.

7. The method of claim 1, wherein aggregating the information obtained from each of the achievement tracking services comprises creating new badges that represent one or more badges from the plurality of achievement tracking services that are combined together.

8. The method of claim 1, wherein providing the user achievement profile comprises serving code for displaying on a profile page of the user badges that represent the first user's achievements.

9. The method of claim 1, wherein providing the user achievement profile comprises providing information to a qualified third party requester that represents the aggregated information.

10. The method of claim 7, wherein a first badge of the one or more new badges represents a sum total of achievements combined from two or more of the achievement tracking services.

11. The method of claim 7, wherein a first badge of the one or more new badges is of a badge type that differs from any badge types received from the achievement tracking services.

12. The method of claim 10, wherein the first badge displays the sum total and contributed totals for each of the achievements from each of the achievement tracking services.

13. The method of claim 11, wherein aggregating the information for the first badge comprises identifying badge types for at least two badges from the achievement tracking services, and identifying a badge type supported by the achievement aggregation system that corresponds to the identified badge types.

14. A computer-implemented user achievement data management system, comprising:
    an organization interface programmed to communicate via electronic communication connections with one or more third-party achievement tracking services that provide information that characterizes one or more achievements made by particular users of the third-party achievement tracking services;
    an aggregator programmed to join achievement information for particular users obtained from different third-party achievement tracking services, so as to generate an aggregated achievement profile that represents a combination of achievements for users across multiple third-party achievement tracking services, wherein the aggregator is also programmed to arrange badges for a particular user and awarded by particular ones of the plurality of achievement tracking services into a single integrated representation of badges that includes badges from different services that are independent of each other and wherein the system receives a user selection of ones of the plurality of achievement tracking services to be included in an aggregated achievement profile for the user; and a user interface arranged to generate content that, when displayed, shows the joined achievement information in a single integrated display of achievement information for particular users, the content including graphical icons produced by each of the different third-party achievement tracking services and that represent a defined achievement for the respective third-party achievement tracking service that may be earned by a user of the respective third-party achievement tracking service upon performing tasks communicated to user by the respective achievement tracking service.

15. The system of claim 14, wherein the aggregator is further programmed to aggregate the information obtained from each of the third-party achievement tracking services with information sufficient to characterize one or more achievements obtained by the particular user with an organization that operates the data management system.

16. The system of claim 14, wherein the user interface is arranged to provide a list of social networking services to the particular user and receive a selection from the particular user in response to providing the list to the particular user, the selection identifying services to which the organization interface is to establish connections.

17. The system of claim 14, wherein the electronic communication connections are established using a public, open connect-style application programming interface.

18. The system of claim 14, wherein the means for creating aggregated data is arranged to aggregate the information obtained from each of the third-party achievement tracking services with information sufficient to characterize one or more achievements obtained by the particular user with an organization that operates the data management system.

19. The system of claim 14, wherein the user interface is arranged to provide a list of social networking services to the particular user and receive a selection from the particular user in response to providing the list to the particular user, the selection identifying services to which the organization interface is to establish connections.

20. A computer-implemented user achievement data management system, comprising:

an organization interface programmed to communicate via electronic communication connections with one or more third-party achievement tracking services that provide information that characterizes one or more achievements made by particular users of the third-party achievement tracking services, wherein a first third-party achievement tracking service operates independently from at least a second third-party achievement tracking service, and the first and second third-party achievement tracking services are operated by separate organizations;

means for creating aggregated data out of individual user data from different third-party achievement tracking services to reflect total achievements for users across the achievement tracking services, including by arranging badges awarded by each of the one or more third-party achievement tracking services for a particular user into a single integrated representation of badges that includes badges from the different independent services and wherein the system receives a user selection of ones of the plurality of achievement tracking services to be included in an aggregated achievement profile for the user; and a user interface for generating content that, when displayed, shows the total achievements in a single integrated display of achievement information for particular users, the content including graphical icons produced by each of the different third-party achievement tracking services and that represent a defined achievement for the respective third-party achievement tracking service that may be earned by a user of the respective third-party achievement tracking service upon performing tasks communicated to user by the respective achievement tracking service.

\* \* \* \* \*